3,168,439
COMPOSITION COMPRISING N-(3',4'-DIMETHOXY-PHENYLETHYL)-2,6-DIKETOPIPERAZINE AND 2-METHYL-3-ORTHO-TOLYL - 4(3H)QUINAZOLINONE
Gustav J. Martin, Philadelphia, Pa., assignor to William H. Rorer, Inc., Fort Washington, Pa., a corporation of Pennsylvania
No Drawing. Filed Feb. 25, 1963, Ser. No. 260,840
6 Claims. (Cl. 167—65)

The present invention relates to a drug for adminstration to mammals, particularly human beings, to the potentiation of drugs so administered, and to methods of tranquilizing and/or elevating the mood of mammals.

A purpose of the invention is to make it possible to eliminate the side effects incident to use of N(3'-4'-dimethoxyphenylethyl)-2,6-diketopiperazine herein referred to as "diketopiperazine," as a tranquilizer and/or mood elevator and to potentiate the said piperazine as a tranquilizer and/or mood elevator.

A further purpose is to avoid the side effects such as stomach pain, nausea and vomiting which were experienced previously in the administration of said diketopiperazine by mouth and to make it possible to administer the same generally by mouth.

A further purpose is to make the said diketopiperazine effective as a tranquilizer and/or mood elevator at lower dosage levels which will eliminate the previous difficulties with side effects.

Further purposes appear in the specification and in the claims.

N(3'-4'-dimethoxyphenylethyl) - 2,6 - diketopiperazine was formerly placed on the market as a tranquilizer administered by mouth (U.S. Patent 3,026,321). A large number of people (approximately 50%) exhibited the side effects of the general character of stomach pain, nausea or vomiting. This has been sufficiently serious to result in taking said piperazine off the market notwithstanding that it has very desirable benefits as a tranquilizer.

I have discovered that the difficulty due to such side effects can be avoided in administering the said diketopiperazine by mouth as a tranquilizer.

This is accomplished by potentiating the piperazine with 2-methyl-3-o-tolyl-4-quinazolone or its pharmaceutically acceptable salts such as the —HCl salt, referred to as "quinazolones." Said quinazolones not only potentiate but they broaden the therapeutic range of the diketopiperazine since it can be helpful to patients requiring tranquilization and also those requiring mood elevation. By such potentiation the said piperazine is rendered much more effective so that it need not be used in high dosage levels, and is therefore free from side effects.

The product of the invention exhibits no side effects and is practical for administration by the physician as a tranquilizer and/or mood elevator taken by mouth.

The diketopiperazine above referred to augments the effect of barbiturates in mice and ether in rats. It inhibits the conditioned escape response in rats. It is practically devoid of anti-convulsive, analgesic or anti-tussive activity. It diminishes the tone of skeletal muscles without interfering with neuromuscular transmission or polysynaptic spinal reflexes.

It exhibits slight antispasmodic activity on smooth muscles. The oral LD–50 of the piperazine in mice exceeds 1.0 gram per kilogram.

The quinazolone may be administered as the base, or as a pharmaceutically acceptable salt such as the hydrochloride, sulphate, citrate, tartrate, maleate or the like.

The quinazolones above referred to exhibit sedative and hypnotic properties when administered in large doses. When incorporated in the dosage ranges referred to in the present application, they augment or potentiate the effect of the piperazine. Thus the diketopiperazine is able to exhibit the desired effect without being used in a dosage range which can cause the side effects previously observed, such as stomach pains, nausea and vomiting. In the present invention the level of the diketopiperazine is always kept well below the lowest dosage which has previously been known to produce these side effects and preferably at 50 percent of such lowest dose producing side effects.

The LD–50 of said quinazolones for oral administration in mice is greater than 1000 mg. per kilogram.

Indications are that the initial dosage of the dosage unit of the invention should be one unit (tablet) and that this dosage be increased until the desired effect is obtained but in no case should it exceed twelve dosage units (tablets) in any 24 hour period.

The previous experience with the diketopiperazine indicates that side effects were exhibited at daily doses of 300 to 600 milligrams.

The product of the invention is indicated for use as a mild tranquilizer of the meprobamate type. It quiets anxiety and elevates the mood. It is favorably indicated as a muscle relaxant. There are indications that it is efficacious to parallel the phenothiazines while avoiding the serious side effects of the phenothiazines.

The product of the invention is believed to have benefit in the treatment of specific mental diseases, one of which, on which further work is contemplated, being schizophrenia as mentioned below.

*Dosage*

The product of the invention is administered by mouth suitably in the form of a tablet. It can conveniently be made up to a desired tablet size by adding pharmaceutically acceptable carriers such as starch, sugar and the like. The tablet need not be coated, although coating can be used if desired.

The product of the invention is believed to have application in the veterinary field, for example for administration to especially larger mammals such as horses, cows, dogs, cats, zoo mammals (lions, tigers, bears, etc.).

For general veterinary use the dosage in 24 hours should be between 0.6 and 5.6 milligrams of the said diketopiperazine and between 1.05 and 8.4 milligrams of one of the said quinazolones per kilogram of body weight, both being administered in the same dosage unit. These quantities include a maximum which is not desirable to be administered as one dosage unit, but should preferably be fed in the form of twelve tablets, either one or two or three at a time.

The preferable dosage unit for veterinary use is about 1.4 milligrams of the said diketopiperazine and about 2.1 milligrams of one of the said quinazolones per day per kilogram of body weight. This dose can be divided into six units, and from one to six units can be administered preferably after meals.

The greatest use of the tranquilizer and/or mood elevator of the invention is, however, expected to be for administration to humans.

In this case the individual dosage unit or tablet should contain preferably about 33 milligrams of said diketopiperazine and preferably about 50 milligrams of one of the said quinazolones.

From two to twelve tablets per day may be administered and the average dosage is three tablets per day. Thus the human dose is from one tablet b.i.d. to four tablets t.i.d. The tranquilizer and/or mood elevator is desirably taken after meals.

The dosage range is then 66 to 396 milligrams of diketopiperazine and 100 to 600 milligrams of one of the said quinazolones.

Heavier doses may be given in a dosage unit containing 99 milligrams of diketopiperazine and 150 milligrams of one of the said quinazolones.

These dosage figures are based upon adult weight and will be diminished proportionately in the case of children.

*Clinical studies*

Preliminary studies of the pharmacological behavior of the present invention have been made. Without attempting to include all the data available a brief summary follows:

The first study was conducted to determine the human pharmacology on 12 healthy adult male subjects. The purpose of the study was to determine the minimum effective daily oral dose, the maximum tolerated daily oral dose and the degree and type of side effects encountered. It was found that in 7 out of the 12 subjects two tablets or less twice a day was the minimum effective daily dose. The maximum tolerated daily dose was found to be four to eight tablets three times a day. The medication had a tranquilizing effect on all subjects and in some subjects a stimulating effect was also exhibited.

One advantage of the invention noted in this study is the fact that it often produces a mild weight loss whereas phenothiazines caues many patients to gain markedly in weight. The product of the invention is, therefore, indicated in subjects where gain in weight is contraindicated.

A second study was conducted on mentally ill patients using a dosage unit containing 33 milligrams of the diketopiperazine and 50 milligrams of the quinazolone hydrochloride.

Patients who were diagnosed on admission to a hospital as having a non-organic psychosis were classified with respect to four basic behavior syndromes without regard to form diagnostic categories.

Fifty-one patients were treated with the dosage unit of the invention, two tablets twice a day being administered to female patients and three tablets twice a day to male patients. No further adjunctive or additional psychotherapy was attempted.

A second group of 43 patients were treated with the particular marketed drug which was most favorable to the patient as observed from previous clinical experience.

The percentage of patients experiencing some degree of improvement was approximately the same for the group receiving the dosage unit of the invention (83%) and for the control group receiving other drugs (86%). The percentage of patients showing a high degree of improvement likewise was about the same for the groups treated with the dosage unit of the invention (48.3%) and with other drugs (53.5%).

It was found that the dosage unit of the invention was most beneficial in the non-agitated cases and best results were obtained in cases which were classified as depressed and catatonic. The antidepressant quality of the dosage unit of the invention was found to be most striking. It brightened the mood of patients while at the same time permitting a return of initiative and motivation.

The general effectiveness of the dosage unit of the invention in the treatment of a miscellaneous group of psychotic patients, particularly as an antidepressant, and the absence of restrictive side effects, indicate a potentially useful role for this drug, particularly where the patient can be benefited by an antidepressant.

It has been found that the said quinazolone can be administered effectively as the base, or as any one of the pharmaceutically acceptable salts. Experiments indicate that the results are comparable whether the base itself is administered of the salt. In the test data given above hydrochloride has been used merely as a matter of convenience and good results are obtained administering the base alone or the salt.

In view of my invention and disclosure, variations and modifications to meet individual whim or particular need will doubtless become evident to others skilled in the art to obtain all or part of the benefits of my invention without copying the process and composition shown, and I, therefore, claim all such insofar as they fall within the reasonable spirit and scope of my claims.

Having thus described my invention, what I claim as new and desire to secure by Letters Patent is:

1. As a tranquilizer and mood elevator, a composition for administration to a human being by mouth comprising a combination of from 66 to 396 milligrams per day of N-(3',4'-dimethoxyphenylethyl)-2,6-diketopiperazine and from 100 to 600 milligrams per day of a compound selected from the group consisting of 2-methyl-3-o-tolyl-4-quinazolone and the pharmaceutically acceptable salts thereof.

2. A dosage unit composition for administration to a human being by mouth comprising N-(3',4'-dimethoxyphenylethyl)-2,6-diketopiperazine and a compound selected from the group consisting of 2-methyl-3-o-tolyl-4-quinazolone and the pharmaceutically acceptable salts thereof, in the proportions of 1 milligram of quinazolone to 0.66 milligram of diketopiperazine.

3. A dosage unit composition for a tranquilizer administered to a human being by mouth comprising about 33 milligrams of N-(3',4'-dimethoxyphenylethyl)-2,6-diketopiperazine, and about 50 milligrams of a compound selected from the group consisting of 2-methyl-3-o-tolyl-4-quinazolone and the pharmaceutically acceptable salts thereof, said dosage unit being prescribed in the range from 2 to 12 units per day for an adult human being.

4. A method of potentiating the effect of N-(3',4'-dimethoxyphenylethyl)-2,6-diketopiperazine as a tranquilizer and mood elevator, which comprises administering said diketopiperazine by mouth to a human being in a dosage of 66 to 396 milligrams per day and concurrently administering by mouth from 100 to 600 milligrams of a compound selected from the group consisting of 2-methyl-3-o-tolyl-4-quinazolone and pharmaceutically acceptable salts thereof.

5. A method of claim 4, in which the dosage of the said diketopiperazine is about 99 milligrams per day and the dosage of the said quinazolone is about 150 milligrams per day.

6. A method of potentiating the effect of N-(3',4'-dimethoxyphenylethyl)-2,6-diketopiperazine as a tranquilizer and mood elevator for a human being, which comprises administering by mouth a dosage unit of about 33 milligrams of the said piperazine and concurrently administering about 50 milligrams of a compound selected from the group consisting of 2-methyl-3-o-tolyl-4-quinazolone and the pharmaceutically acceptable salts thereof, and administering between 2 and 12 such dosage units to an adult human being per day.

References Cited by the Examiner

FOREIGN PATENTS 855,379   11/60   Great Britain.

OTHER REFERENCES

Methaqualone, J. Am. Med. Assoc., Vol. 179, No. 4, p. 120, Jan. 27, 1962.

JULIAN S. LEVITT, *Primary Examiner.*

F. CACCIAPAGLIA, JR., *Examiner.*